US012741724B2

(12) United States Patent
Whitmyer, Jr. et al.

(10) Patent No.: US 12,741,724 B2
(45) Date of Patent: Sep. 22, 2026

(54) SAILING INSTRUMENT WITH FUNCTION LIMITATION

(71) Applicant: WhitServe LLC, Stamford, CT (US)

(72) Inventors: Wesley W. Whitmyer, Jr., Stamford, CT (US); Declan W. Whitmyer, Stamford, CT (US)

(73) Assignee: WhitServe LLC, Stamford, CT (US)

( * ) Notice: Subject to any disclaimer, the term of this patent is extended or adjusted under 35 U.S.C. 154(b) by 281 days.

(21) Appl. No.: 18/737,083

(22) Filed: Jun. 7, 2024

(65) Prior Publication Data

US 2025/0376247 A1 Dec. 11, 2025

(51) Int. Cl.
*G01C 21/20* (2006.01)
*B63B 49/00* (2006.01)

(52) U.S. Cl.
CPC ............ *B63B 49/00* (2013.01); *G01C 21/203* (2013.01)

(58) Field of Classification Search
CPC ....... B63B 49/00; B63B 45/00; G01C 21/203; G01C 21/20
See application file for complete search history.

(56) References Cited

U.S. PATENT DOCUMENTS

2015/0254910 A1* 9/2015 Summers ............. G01C 21/203 701/31.5
2019/0114846 A1* 4/2019 Whitmyer, Jr. .......... B63J 99/00

OTHER PUBLICATIONS

Chunlong Ma et al., The Design of Vehicle Tracking and Positioning System, Aug. 1, 2018, International Conference on Intelligent Human-Machine Systems and Cybernetics, pp. 339-342 (Year: 2018).*
Igor Khokhlov et al., The Machine Learning Models for Activity Recognition Applications with Wearable Sensors, Dec. 1, 2019, International Conference on Machine Learning and Applications, pp. 387-391 (Year: 2019).*

* cited by examiner

*Primary Examiner* — Tam T Tran
(74) *Attorney, Agent, or Firm* — Whitmyer IP Group LLC

(57) ABSTRACT

A sailboat racing instrument having a fully-featured mode and a one-design compliant mode. For example, the instrument may be mountable to the sailboat in portrait and landscape mounting positions with a different mode corresponding to each mounting position. The instrument may sense which mounting position and select a mode accordingly. The mounting position may indicate to competitors which mode the instrument is in, e.g., the one-design-compliant mode. The instrument may alter its color in addition to or in lieu of mounted position to indicate its mode to competitors. In a one-design-compliant mode the instrument may present only speed or distance to line or both in a single color or mounting position.

17 Claims, 9 Drawing Sheets

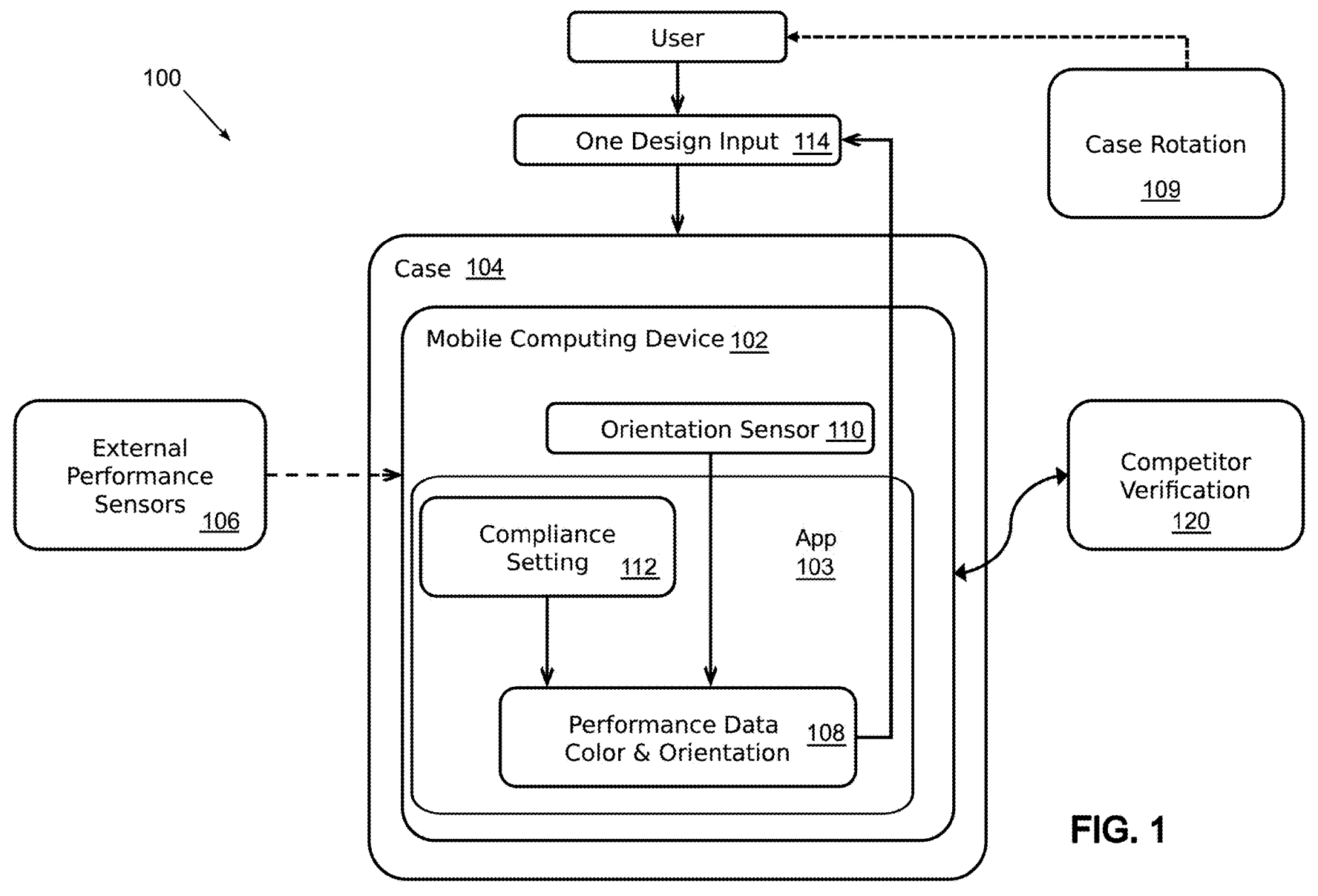

100

User

One Design Input 114

Case Rotation 109

Competitor Verification 120

Case 104

Mobile Computing Device 102

Orientation Sensor 110

App 103

Compliance Setting 112

Performance Data Color & Orientation 108

External Performance Sensors 106

FIG. 1

SAILING INSTRUMENT WITH FUNCTION LIMITATION

TECHNICAL FIELD

The present disclosure relates to instruments for sailboats.

BACKGROUND

Sailboat instruments are mobile computing devices mounted to sailboats that report performance data to operators of the sailboat. Performance data can include things such as speed over ground, course over ground, heading, heel, trim, distance to the line, and others. The performance data may be directly sensed by the mobile computing device, or it may be received from a remote sensor via wire, Bluetooth, Wi-Fi, and the like.

Racing sailors use the data for sailing competitions. The competitions are organized according to rules that may permit or forbid sailors to use certain types of performance data. Often, the rules forbidding use of certain types of data are focused on smaller sailboats and so-called one-design sailboats. One-design sailboats are identically manufactured according to a set of Class Rules. In order to foster competition at reduced cost, Class Rules often prohibit use of certain types of performance data and/or instruments in sanctioned, compliant competitions.

Examples of the type of performance data/instruments prohibited in some on-design class rules include: boat speed, wind speed, wind direction, distance to the line, electronic compasses. In other one-designs and on larger sailboats, there are no such restrictions.

Accordingly, different types of sailboat instruments are available. At the high end of the market, fully-featured instrument systems include many functions prohibited for use in most sailboat competitions. These instruments integrate with myriad external sensors and include logic for operating electro-mechanical and/or hydraulic systems to automatically control sailboat functions such as steering and sail trim. Commercial examples include B&G, Autohelm and the like.

At the low end of the market, sailing watches include a basic countdown function that aids sailors to effectively start the race. These are permitted for use in virtually all sailboat competitions. Commercial examples include Optimum Time, Casio, Garmin, Ronstan, Timex, and others.

In the middle, are racing instruments. Racing instruments don't integrate with any automatic controllers, but they often do integrate with external sensors to report data. Many sets of one-design Class Rules prohibit the types of data presented on racing instruments. So, racing instruments fall into two categories. Fully-featured which display myriad data types and electronic compasses which only display heading. Most one-design competitions permit electronic compasses, but many prohibit speed and other modern functions. Electronic compasses retail for $400-600 and commercial examples include Raymarine, Tack-Tick, Shift, and others. And fully-featured racing instruments retail for $1000-$1300 with commercial examples including Vakaros Atlas, and Velocitek ProStart.

Many sailors can't afford fully-featured racing instruments, and they certainly can't afford to buy both instrument types in order to be one-design/Class Rules compliant when they race, but also enjoy the training advantages of using a fully-featured instrument on which they can see e.g. how their manipulations of the boat and sails impact speed.

Manufacturers of full-featured racing instruments have proposed a solution to this dichotomy in an effort to alleviate racing sailors having to buy two different instrument devices. The idea is to add a setting/function to the fully-featured instrument which would make an "immutable log" providing evidence that the instrument had been modified during the time of the competition so that that the fully-featured instrument could remain mounted to the sailboat for use as a one-design and/or Class Rules compliant device because the instrument would not/could not display boat speed, or whatever item(s) of performance data are not permitted by any particular one design sailboat racing class.

There are several problems with this proposed solution. First, there is no way for competing boats using a mere, and clearly one-design/Class Rules legal, electronic compass from knowing whether their competitor with a fully-featured racing instrument has activated the log/feature disabling function. In addition, the disabled function feature offered by competitors turns race organizers into instrument police. They are generally volunteers and don't want to be involved in equipment related disputes between competitors, especially since the sailboat racing rules are designed to be corinthian and self-enforcing. But the only way competitors can be assured of compliance without easy confirmation by a clear visual from the competitors boat is essentially to accuse the competitor of cheating.

What is desired therefore is a sailboat racing instrument that includes full features for use in training and on larger and non-one-design sailboats, but can also be configured for use on smaller, one-design boats that limit the use of certain types of performance data and also is self-enforcing and does not require intervention by the race organizers to ensure compliance.

SUMMARY

The invention provides a solution to these and other shortcomings of sailboat racing instruments.

In one aspect the invention provides a sailboat racing instrument that has a fully-featured mode and a one-design compliant mode.

In another aspect the invention provides a sailboat instrument mountable in portrait and landscape mode.

In a further aspect the invention provides a sailboat instrument that includes different features depending on how it is mounted.

In yet another aspect the invention provides a sailboat instrument that senses whether it is in portrait or landscape mode and automatically disables features in one of the modes.

In yet a further aspect the invention provides a sailboat instrument in which the mounting position indicates to competitors that the instrument is one-design compliant.

In still another aspect the invention may use color in addition to or in lieu of mounting position to indicate to competitors that the instrument is one-design compliant.

In still a further aspect the invention provides a sailing instrument which only presents speed or distance to line or both in a single color or mounting position since one or both of these performance data may not be permitted under Class Rules for a given one design sailboat.

BRIEF DESCRIPTION OF THE DRAWINGS

The present teachings are described more fully hereafter with reference to the accompanying drawings, which depict example embodiments. The following description illustrates the present teachings by way of example, not by way of limitation of the principles of the present teachings.

FIG. 1 depicts a sailing instrument 100 that comprises a mobile computing device 102 in a case 104.

It should be understood that throughout the drawings corresponding reference numerals indicate like or corresponding parts and features.

DETAILED DESCRIPTION

For purposes of explanation and not limitation, specific details are set forth such as particular structures, architectures, interfaces, techniques, etc., in order to provide a thorough understanding. In other instances, detailed descriptions of well-known devices and/or methods are omitted so as not to obscure the description with unnecessary detail.

Figure 2:
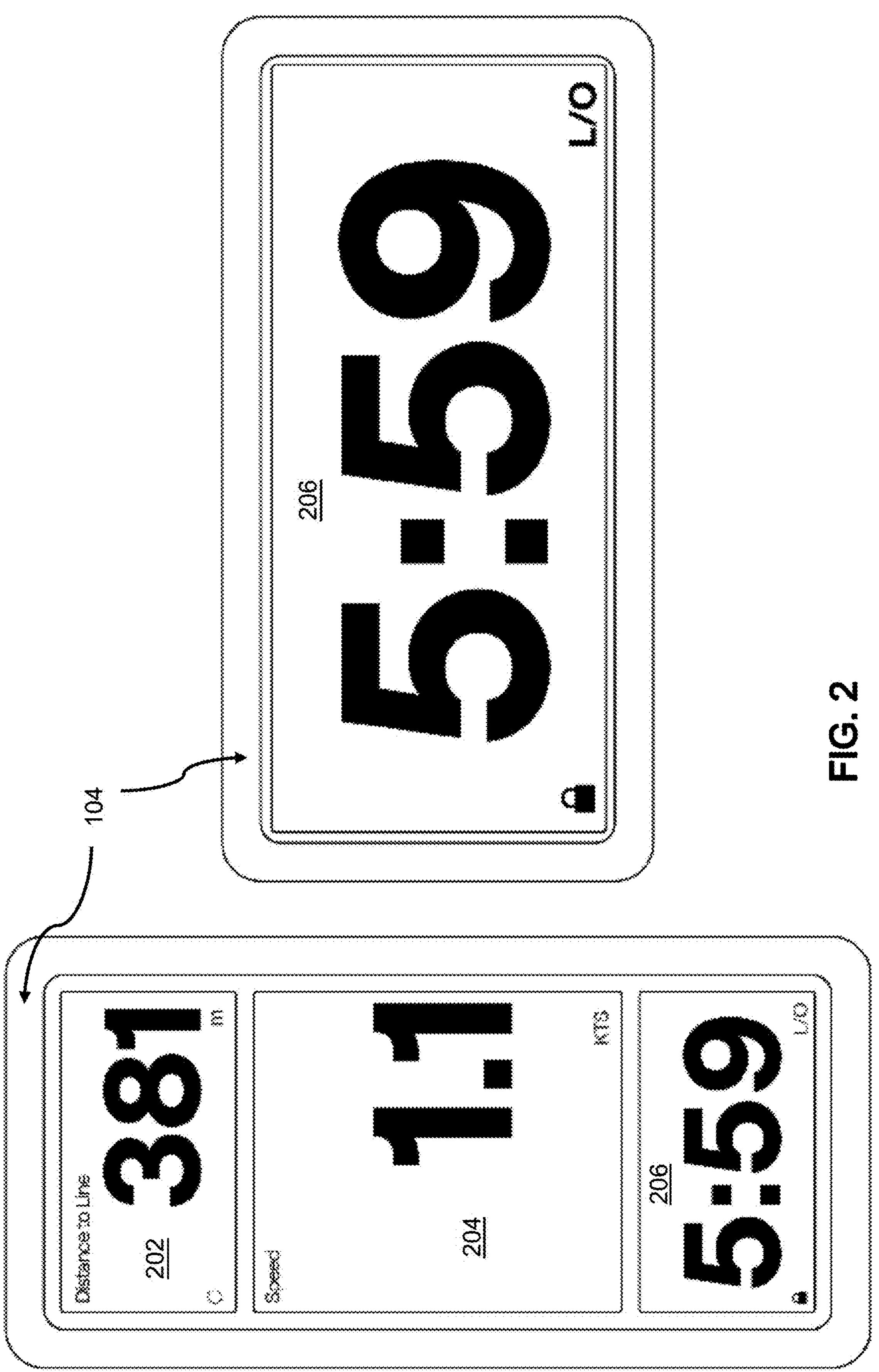
FIG. 2 depicts vertical (unlocked) and horizontal (locked) configurations of a sailing instrument 100.
Figure 3:
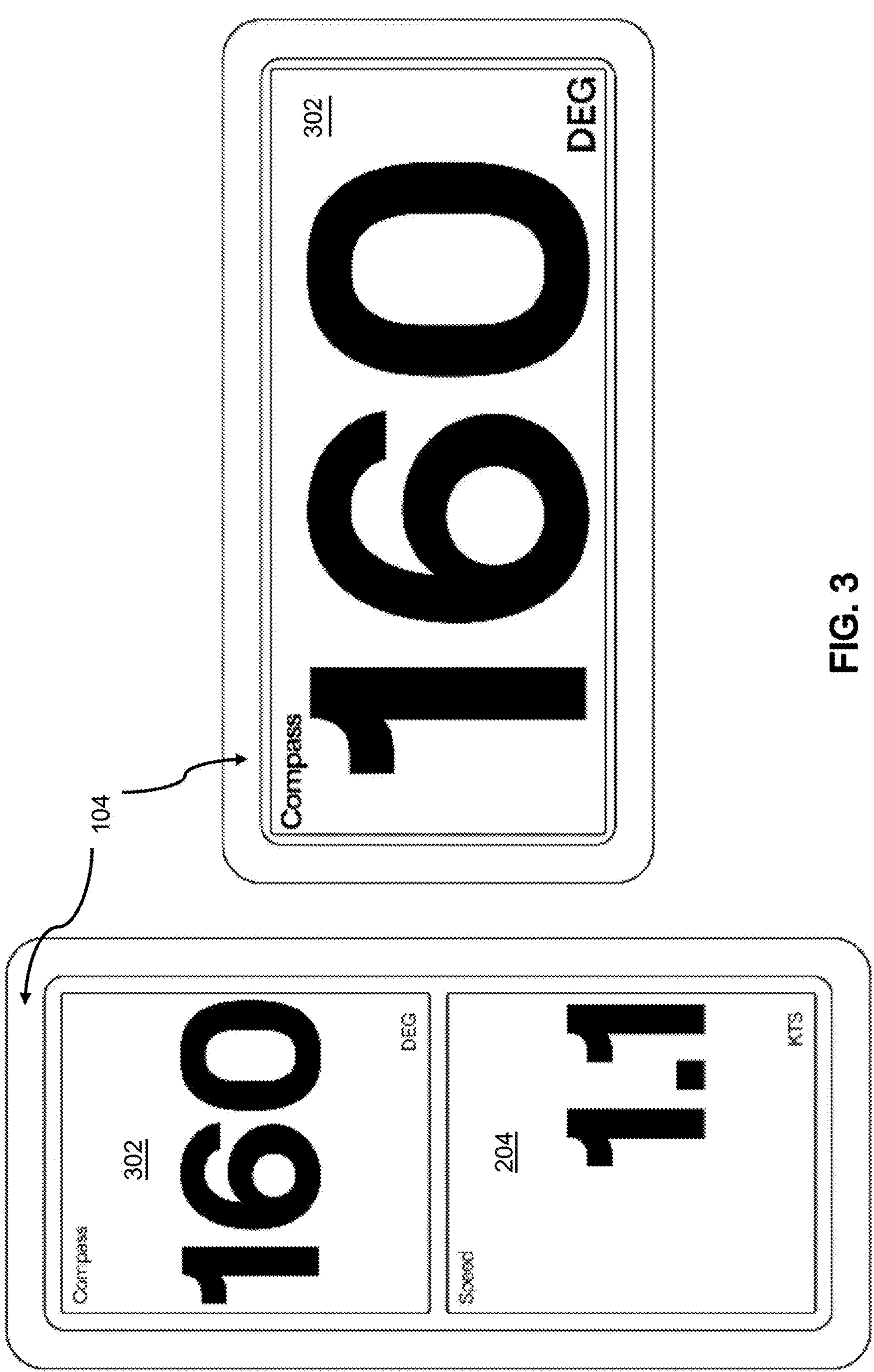
FIG. 3 depicts vertical (unlocked) and horizontal (locked) configurations of a sailing instrument 100.

FIG. 1 depicts a sailing instrument 100 that comprises a mobile computing device (MCD) 102 in a case 104. The MCD 102 implements an app 103 that displays performance data based on information received from sensors of the mobile computing device and/or external performance sensors 106. The MCD 102 is configured to display different performance data in different mounting positions, as shown in FIG. 2 and FIG. 3. The mobile computing device 102 alters the performance data color and orientation 108 in response to a case rotation 109, according to the output of an orientation sensor 110, based on a compliance setting 112. The compliance setting 112 may vary according to a one design input 114 that describes the class of boat on which the sailing instrument is mounted.

For example, as shown in FIG. 2, the compliance setting 112 may be such that when the orientation sensor 110 indicates a portrait mounting position of the MCD 102 (with a long side of the case oriented vertically), the MCD 102 displays performance data such as distance to line 202, speed 204, and time to start ("lights out") 206; whereas when the orientation sensor 110 indicates a landscape mounting position of the MCD 102 (with a short side of the case oriented vertically), the MCD 102 displays only the time to start 206.

As another example, as shown in FIG. 3, the compliance setting 112 may be such that when the orientation sensor 110 indicates a portrait mounting position of the MCD 102, the MCD 102 displays performance data such as compass 302 and speed 204; whereas in a landscape mounting position, the MCD 102 displays only compass 302.

Various types and combinations of orientation sensor 110 may be utilized. For example, an accelerometer, gravitometer, and/or magnetic sensor may be used to sense mounting position of the MCD 102.

Further, the screen color and/or text color of the MCD 102 (the performance data color(s) and/or orientation 108) may be adjusted according to the compliance setting 112. For example, in a portrait mounting position the screen may be black and the text red whereas in the landscape mounting position the screen may be green and the text white. Other easily-distinguishable color combinations will be apparent to an ordinary skilled worker.

Advantageously, having the screen and/or text change color in response to the case rotation 109 will enhance competitor verification 120, so that competitors may promptly lodge a challenge in case the MCD 102 is seen to not be in the correct mounting position or not showing the correct color for a given set of racing rules.

Figure 4:
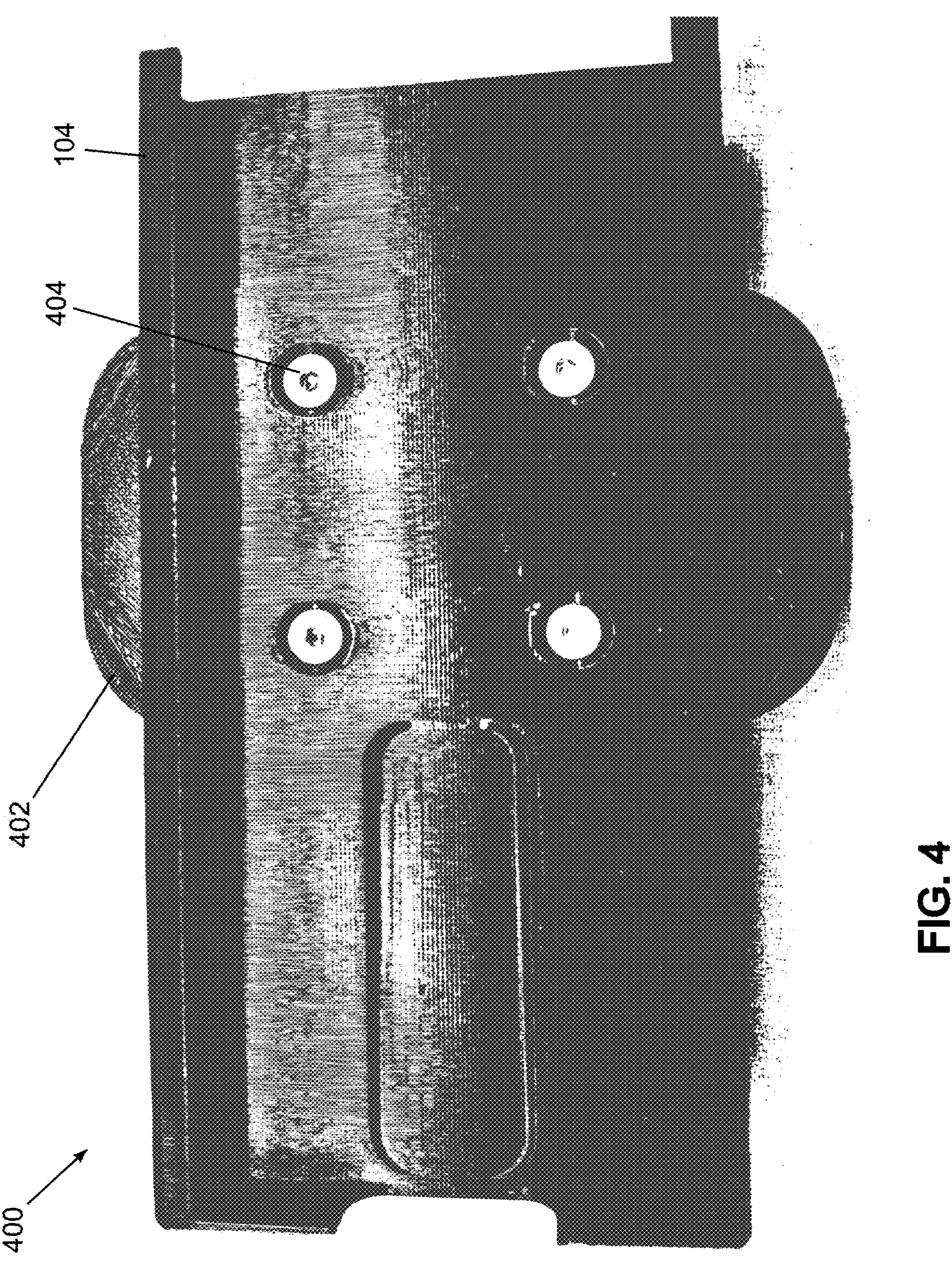
FIG. 4 depicts a mount 400 that may be used for attaching the sailing instrument 100 to a sailboat (not shown).

Rotation of the case 104 and MCD 102 between a portrait mounting position and a landscape mounting position can be accomplished by attaching the case 104 to a sailboat (not shown) using a mount 400, as shown in FIG. 4. The mount 400 includes a bracket 402. The example bracket 402, which is shown in FIG. 4, may include a "slug" that can be insertable into a groove of a sailboat mast. The bracket 402 may include lugs or ears for attaching the base to a sailboat mast or rail using zip ties or the like. The bracket 402 may include a clamping piece, such as a handlebar clamp, that can be used to attach the bracket to a handrail of a sailboat. The bracket 402 may have a base plate that can be glued or screwed to the deck of a sailboat. The case 104 then may be attached to the bracket 402 by fasteners 404, such as screws. Preferably, the screws and screw holes are arranged symmetrically so that the case 104 may be attached to the bracket either in a portrait mounting position or in a landscape mounting position.

Figure 5:
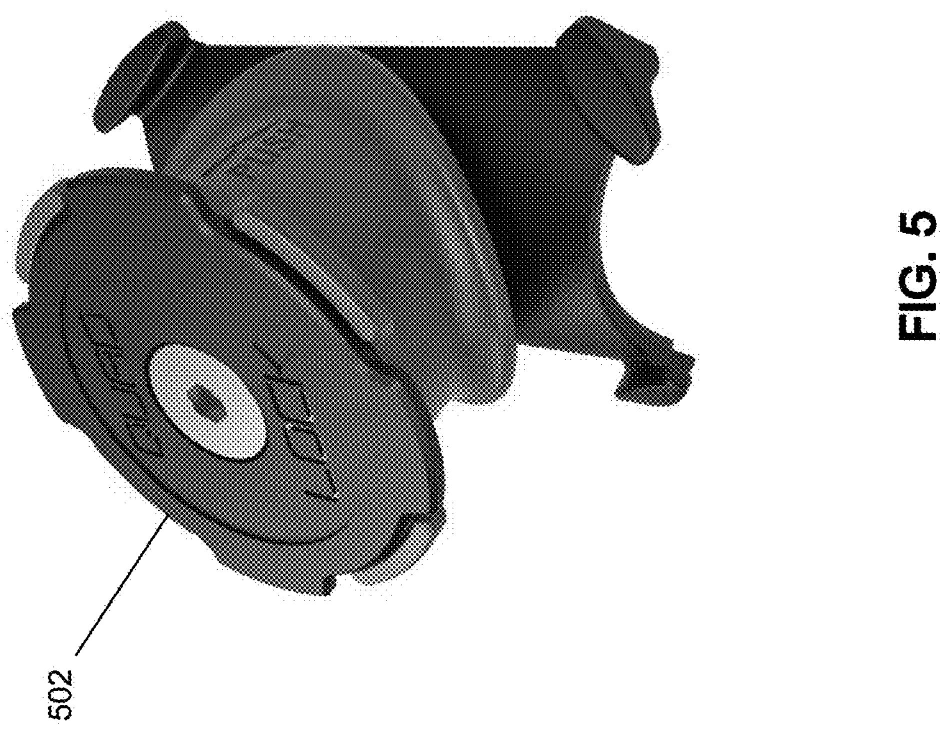
FIG. 5 depicts a bracket 502 that may be used for attaching the sailing instrument 100 to a sailboat (not shown).

Another option for a bracket 502 is shown in FIG. 5. This type of bracket has protrusions 504 in a circular configuration that can mate with a circular configuration of indentations (not shown) on the back of a case such as the case 104. The case can be placed on the protrusions and rotated either clockwise to lock into a portrait mounting position or counterclockwise to lock into a landscape mounting position. The bracket 502 may include a "slug" that can be insertable into a groove of a sailboat mast. The bracket 502 may include lugs or ears for attaching the base to a sailboat mast or rail using zip ties or the like. The bracket 502 may include a clamping piece, such as a handlebar clamp, that can be used to attach the bracket to a handrail of a sailboat. The bracket 502 may have a base plate that can be glued or screwed to the deck of a sailboat.

Figure 6:
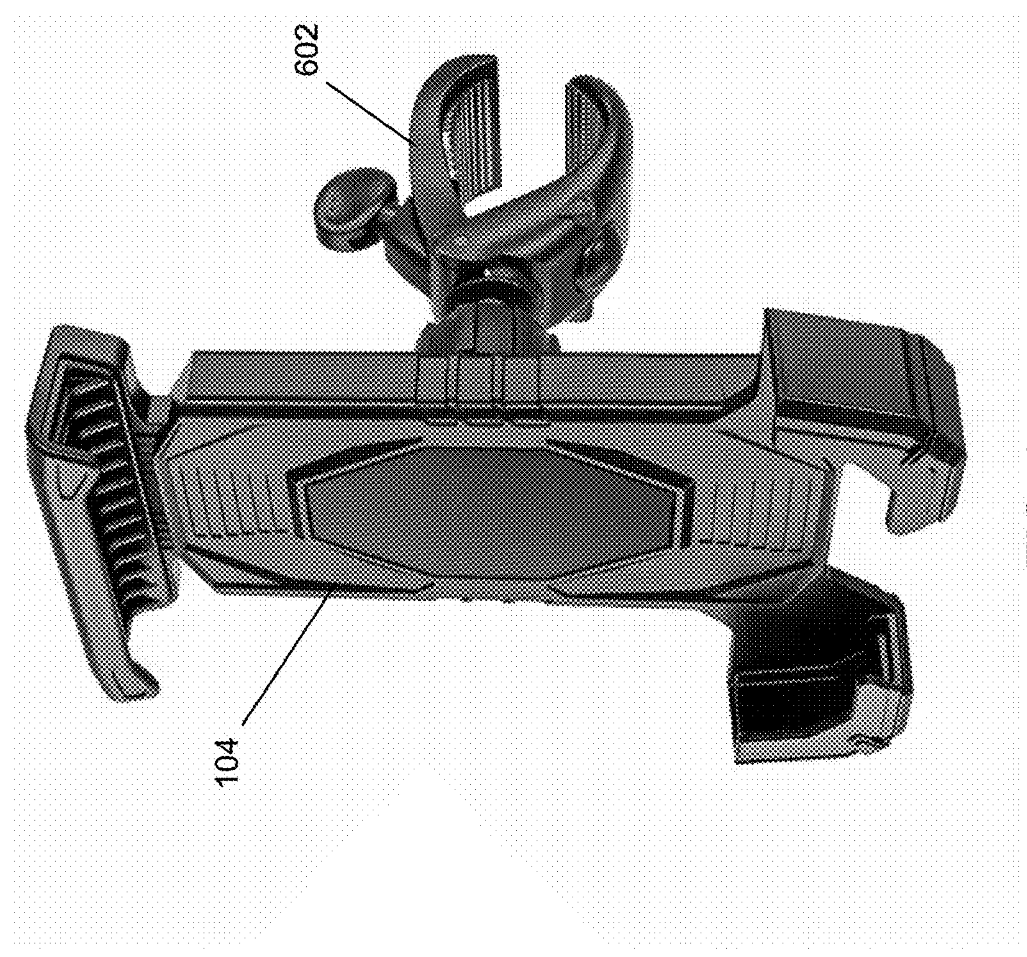
FIG. 6 depicts a bracket 602 that may be used for attaching the sailing instrument 100 to a sailboat (not shown).

Another option for a bracket 602 is shown in FIG. 6. This type of bracket has a swivel that attaches to the back of a case 104. The case can be rotated on the swivel between a portrait mounting position or a landscape mounting position. The bracket 602 includes a clamping piece, such as a handlebar clamp, that can be used to attach the bracket to a handrail of a sailboat.

FIG. 7 through FIG. 12 depict top views of brackets 700, 800, 900, 1000, 1100, 1200 that may be used for attaching the sailing instrument 100 to the mast 701 of a sailboat.

Figure 7:
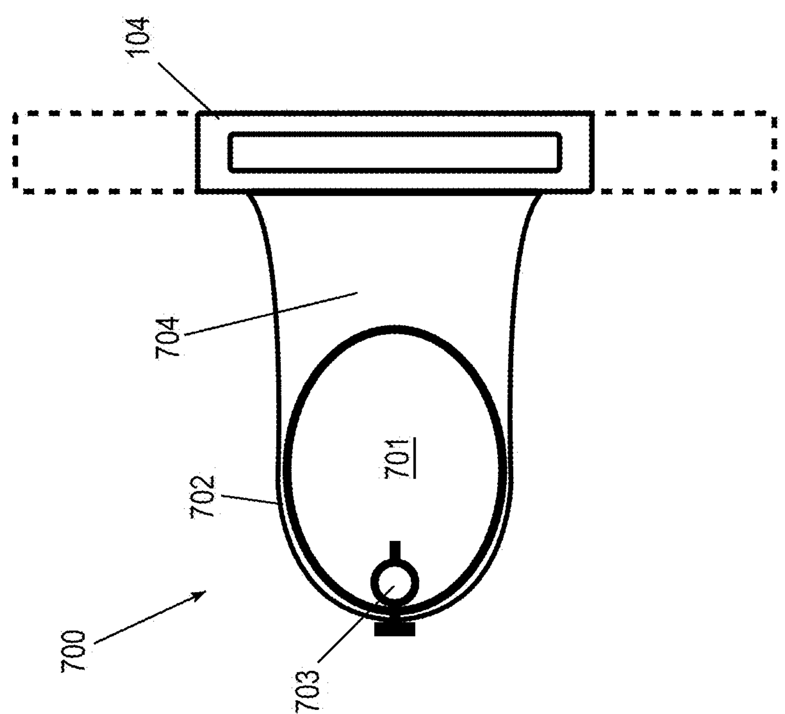

In FIG. 7, the bracket 700 includes an oval clamp 702, which is attached into a sail groove of the mast 701 by a slug 703. The clamp 702 is attached to a flange 704. The sailing instrument's case 104, into and from which the instrument

100 may be inserted and removed, is attached to the flange 704 and can be moved between portrait and landscape positions.

Figure 8:
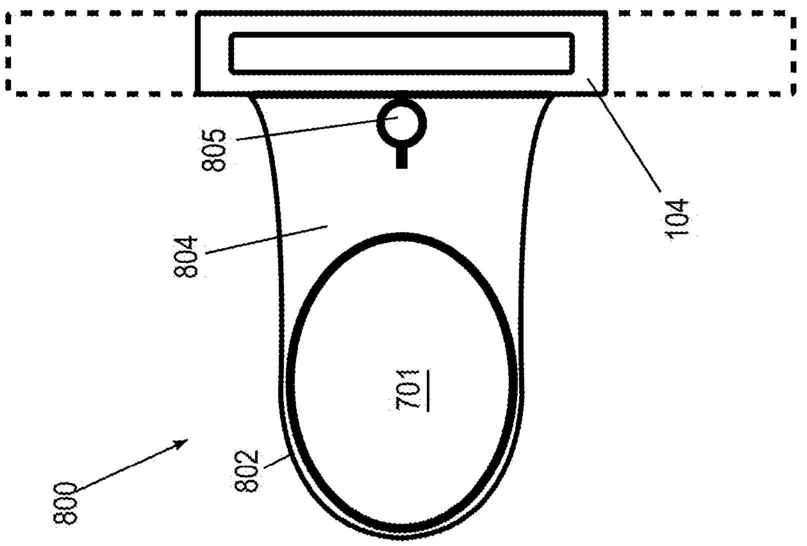
FIG. 7 through FIG. 12 depict top views of brackets 700, 800, 900, 1000, 1100, 1200 that may be used for attaching the sailing instrument 100 to the mast 701 of a sailboat.

In FIG. 8, the bracket 800 includes an oval clamp 802, which is attached to a flange 804. The sailing instrument's case 104 is attached to the flange 804 by a slug 805 and can be moved between portrait and landscape positions.

Figure 9:
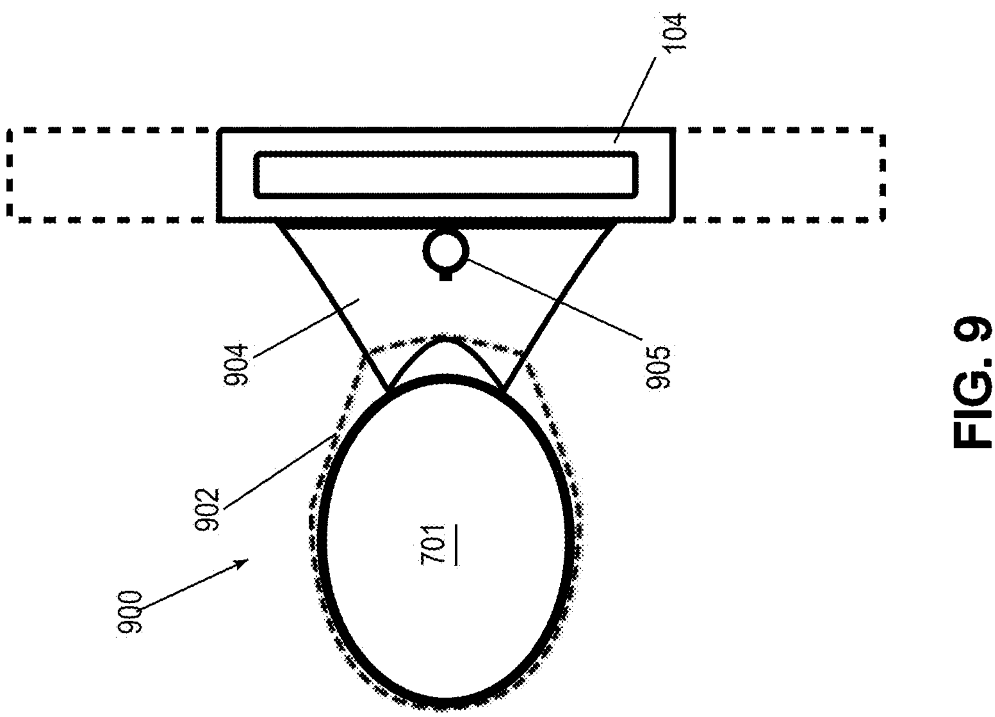

In FIG. 9, the bracket 900 includes an hook-and-loop or buckled fastener strap 902, which holds a flange 904 to the mast 701. The sailing instrument's case 104 is attached to the flange 904 by a slug 905 and can be moved between portrait and landscape positions.

Figure 10:
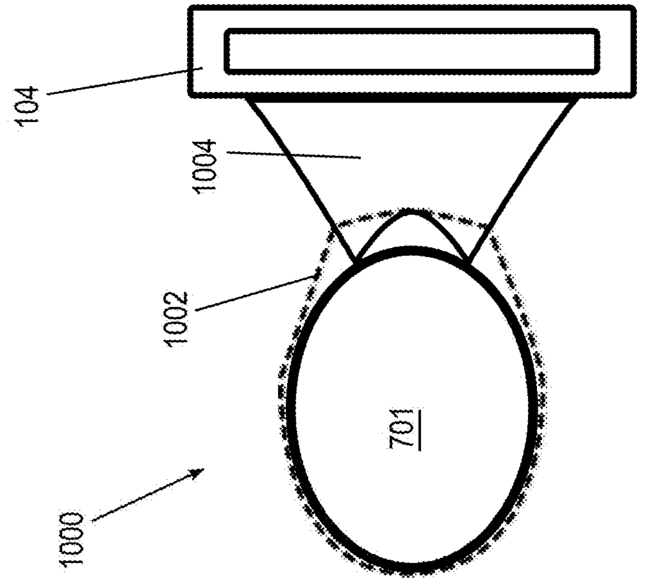

In FIG. 10, the bracket 1000 includes a flange 1004, which is attached to the mast 701 by a strap 1002. The sailing instrument's case 104 is affixed to the flange 1004 and can be moved between portrait and landscape positions.

Figure 11:
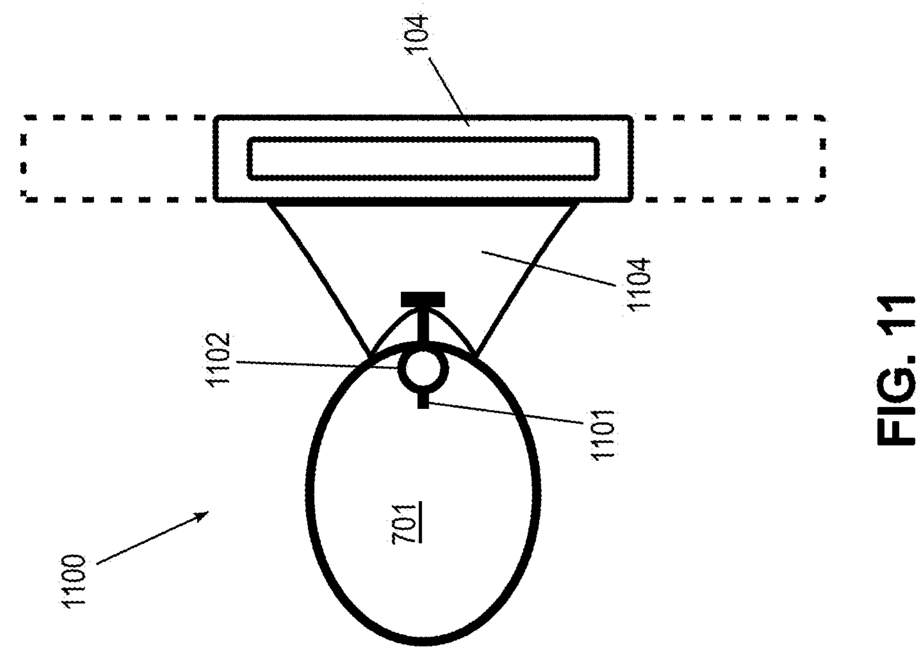

In FIG. 11, the bracket 1100 includes a flange 1104, which is attached into a sail groove 1101 by a slug 1102. The case 104 is affixed to the flange 1104 and can be moved between portrait and landscape positions.

Figure 12:
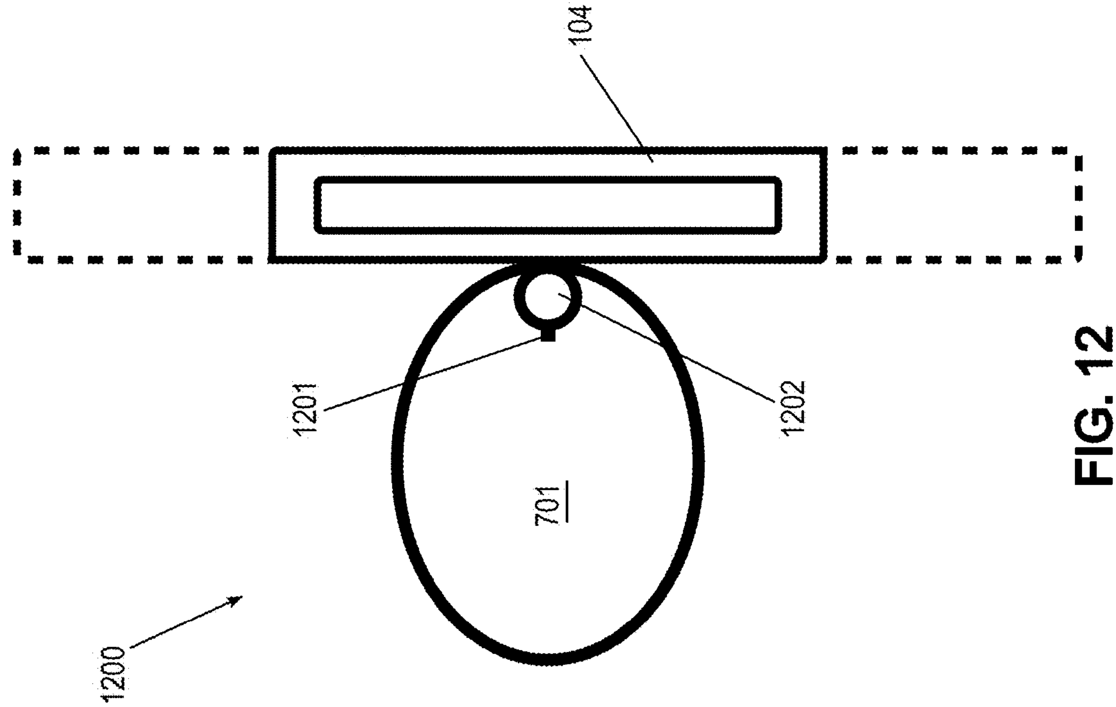

In FIG. 12, the bracket 1200 includes a slug 1202 that is inserted into a sail groove 1201. The case 104 is affixed to the slug 1202 and can be moved between portrait and landscape positions.

The mast-mounted brackets 700, 800, 900, 1000, 1100, 1200 may be clamped around the mast in separate pieces (not shown in detail) or may be slipped up over the bottom of the mast before the mast is mounted in the sailboat.

Figure 13:
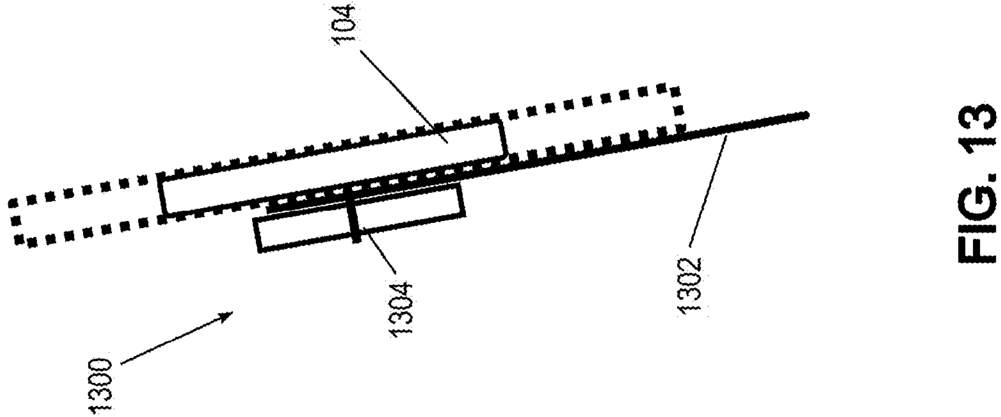
FIG. 13 depicts a side view of a bracket 1300 that may be used for attaching the sailing instrument 100 to the deck of a sailboat.

FIG. 13 depicts a side view of a bracket 1300 that may be used for attaching the sailing instrument 100 to the deck of a sailboat. The case 104 is attached to the deck by way of a stanchion 1302 and a clamp 1304, and can be moved between portrait and landscape positions.

The present teachings have been described in language more or less specific as to structural, mechanical, and functional features. It is to be understood, however, that the present teachings are not limited to the specific features shown and described, since the apparatus, system, and/or method herein disclosed comprises preferred forms of putting the present teachings into effect.

Generally, all terms used in the claims are to be interpreted according to their ordinary meaning in the technical field, unless explicitly defined otherwise herein. All references to a/an/the element, apparatus, component, means, step, etc., are to be interpreted openly as referring to at least one instance of the element, apparatus, component, means, step, etc., unless explicitly stated otherwise. The use of "first", "second," etc., for different features/components of the present disclosure are only intended to distinguish the features/components from other similar features/components and not to impart any order or hierarchy to the features/components, unless explicitly stated otherwise. The phrase "at least one of," when used with a list of items, means that different combinations of one or more of the listed items may be used, and only one item in the list may be needed. For example, "at least one of: A, B, and C" includes any of the following combinations: A; B; C; A and B; A and C; B and C; and A and B and C.

Other than in the operating examples, or where otherwise indicated, all numbers expressing quantities of ingredients or reaction conditions used herein are to be understood as modified in all instances by the term "about".

While the present teachings have been described above in terms of specific embodiments, it is to be understood that they are not limited to those disclosed embodiments. Many modifications and other embodiments will come to mind to those skilled in the art to which this pertains, and which are intended to be and are covered by both this disclosure and the appended claims. For example, in some instances, one or more features disclosed in connection with one embodiment can be used alone or in combination with one or more features of one or more other embodiments. It is intended that the scope of the present teachings should be determined by proper interpretation and construction of any claims and their legal equivalents, as understood by those of skill in the art relying upon the disclosure in this specification and the attached drawings.

What is claimed is:

1. A sailing instrument comprising:

a rectangular, non-square case;

a mobile computing device removably housed in said case;

an app executing on said mobile computing device to present performance data to sailors;

a portrait mounting position in which a longer side of said case is oriented in a generally vertical position when said case is mounted on a sailboat;

a landscape mounting position in which a shorter side of said case is oriented in a generally vertical position when said case is mounted on a sailboat;

a mount for connecting said case to a sailboat in at least said landscape and portrait mounting positions; and a sensor in said mobile computing device for determining if said case is mounted in portrait or landscape mounting position;

wherein said app alters the performance data presented based on the mounted position of said case making the available features of the sailing instrument known to competitors.

2. The sailing instrument of claim 1 in which said app enables presentation of available performance data in one mounted position and only presents one-design-permitted data in the other mounted position.

3. The sailing instrument of claim 1 in which said app only enables presentation of sailboat speed data in one mounted position.

4. The sailing instrument of claim 1 in which said app only enables presentation of distance to line data in one mounted position.

5. The sailing instrument of claim 1 in which said app enables presentation of compass data in all mounted positions.

6. The sailing instrument of claim 1 in which said app enables presentation of a countdown timer in all mounted positions.

7. The sailing instrument of claim 1 in which said app alters at least one of performance data text color or performance data background color.

8. A sailing instrument comprising:

a rectangular, non-square case;

a mobile computing device removably housed in said case;

an app executing on said mobile computing device to present performance data to sailors;

a portrait mounting position in which a longer side of said case is oriented in a generally vertical position when said case is mounted on a sailboat;

a landscape mounting position in which a shorter side of said case is oriented in a generally vertical position when said case is mounted on a sailboat;

a mount for connecting said case to a sailboat in at least said landscape and portrait mounting positions; and a setting in said app for rotating the performance data presented according to whether said case is intended to be mounted in portrait or landscape mounting position;

wherein said app alters the performance data presented based on the mounted position of said case making the available features of the sailing instrument known to competitors.

9. The sailing instrument of claim 8 in which said app enables presentation of all performance data in one mounted position and only presents one-design permitted data in the other mounted position.

10. The sailing instrument of claim 8 in which said app only enables presentation of sailboat speed data in one mounted position.

11. The sailing instrument of claim 8 in which said app only enables presentation of GPS data in one mounted position.

12. The sailing instrument of claim 8 in which said app enables presentation of compass data in all mounted positions.

13. The sailing instrument of claim 8 in which said app enables presentation of a countdown timer in all mounted positions.

14. The sailing instrument of claim 8 in which said app alters at least one of performance data text color or performance data background color.

15. A sailing instrument comprising:

a mobile computing device having a display;

an app executing on said mobile computing device to present performance data to sailors;

a first app color which indicates said app is programmed to permit display of any available performance data;

a second app color which indicates said app is programmed to permit display of only one-design-compliant performance data; and a setting in said app for switching between said first and second app colors to determine what performance data may be presented on the display and to make the available features of the sailing instrument known to competitors.

16. The sailing instrument of claim 15 in which said setting is responsive to an orientation sensor of said mobile computing device.

17. The sailing instrument of claim 16 in which said setting switches to said first app color in response to said orientation sensor sensing a portrait mounting position of said mobile computing device and said setting switches to said second app color in response to said orientation sensor sensing a landscape mounting position of said mobile computing device.

* * * * *